United States Patent [19]

Rives et al.

[11] Patent Number: 4,589,566
[45] Date of Patent: May 20, 1986

[54] PRESSURE RESPONSIVE SAFETY INTERLOCK

[75] Inventors: Joe F. Rives; Forrest L. Carson, both of Borger, Tex.

[73] Assignee: J. M. Huber Corporation, Locust, N.J.

[21] Appl. No.: 721,263

[22] Filed: Apr. 8, 1985

[51] Int. Cl.⁴ ............................................. B65D 45/00
[52] U.S. Cl. .................................................. 220/316
[58] Field of Search ............... 220/316, 367, 303, 327, 220/298, DIG. 20; 137/192; 251/250, 333

[56] References Cited

U.S. PATENT DOCUMENTS 4,139,118  2/1979  Parker ................................. 220/316
4,367,823  1/1983  Raver .................................. 220/316
4,452,372  6/1984  Rolins ................................. 220/316

Primary Examiner—George T. Hall
Attorney, Agent, or Firm—Harold H. Flanders; Alec H. Horn; Loren Helmreich

[57] ABSTRACT

A safety interlock device is provided for preventing the opening of a vessel containing a pressurized fluid. In a typical application, the interlock device may be used in industrial applications to prevent the inadvertent unscrewing of a cap from the end of a large pressure vessel containing a hazardous gas. A pressure port end of the interlock body is adapted for threaded engagement with the vessel and is open to vessel pressure. A pressure-responsive locking piston movable within the body prohibits removal of a stem when vessel pressure exceeds a selected minimum pressure. A chain may be secured at each end to the stem and vessel cap, so that the cap cannot be unscrewed to open the container unless the stem is first removed. In one embodiment, the locking piston is prevented from manual override by the position of a second piston and a plurality of ball members locked in a groove.

20 Claims, 5 Drawing Figures

PRESSURE RESPONSIVE SAFETY INTERLOCK

BACKGROUND OF THE INVENTION

The present invention relates to safety interlock devices responsive to fluid pressure in a system, and, more particularly, to safety interlock devices for inadvertently preventing the opening of an industrial pressure vessel containing a hazardous gas.

Various types of vessels are utilized for storing or transmitting hazardous gas. In a typical industrial installation, a cylindrical-shaped vessel may be provided with a wall-sized end cap. Such vessels may contain hydrogen sulfide, phosgene, or other hazardous fluids. Special safety precautions are obviously recommended to prevent the inadvertent release of gas, since the consequences of a leak may be life-threatening.

In order to accomplish inspection, maintenance, or repair operations, it may be necessary to remove the hazardous gas from the vessel and unthread the end cap for vessel access. In such a situation, cap removal is accomplished with an enormous cap retainer and threading device, and the operation, once commenced, cannot be easily and quickly reversed. If even low-pressure hazardous gas is present in the vessel, the release of gas during the cap unscrewing operation would subject nearby personnel to high risk. A conventional pressure indicator may be utilized to determine gas pressure or system pressure in such a vessel. Because of the hazardous nature of the gas, operating personnel are instructed not to unscrew the cap unless the pressure indicator reads "0" pressure.

In theory, such a pressure indicator should be sufficient to insure that no pressure is within the vessel, so that the cap removal operation may proceed without risking a hazardous gas exposure to nearby personnel. In practice, however, such a pressure indicator may provide insufficient assurances for operator safety in view of the hazardous nature of the gas. In particular, the pressure indicator may be defective and the reading inaccurate, or the indicator might not be sufficiently responsive to produce an accurate reading at a very low pressure, e.g., 2 psi. Moreover, even if the pressure indication reading were accurate, cap removal operators may have reason to doubt the reliability of the reading, or may erroneously assume that there is no pressure in the vessel and therefore neglect to read the indicator before commencing the cap removal operation. The interlocking device of the present invention is designed to provide additional protection against cap removal when the vessel contains either a high or relatively low pressure fluid.

The concept of a pressure-responsive interlock device is known in the art, as illustrated in the brochure entitled "MODCO Pipeline Hinged Closures", No. 1-84 5M, distributed by Modco Industries, Inc. The above interlock has, however, disadvantages which limit its acceptance in the industry. When under high system pressure, it may be very difficult, although possible, to manually override the interlock and open the cap. More importantly, the effort required to deactivate the interlock device when under low system pressure, e.g., 1-5 psi, is non-existent or barely existent Should the operator observe a minimal resistance upon moving the cover down, he must subjectively determine whether that resistance is due to a low fluid pressure in the vessel, or due to increased friction of moving parts because of corrosion or "plugging" of the device. Also, the same motion is utilized to both deactivate the interlock and hopefully notice the resistance presumably indicative of low pressure gas, and this downward cover movement may occur so rapidly that no operator thought occurs while the action is accomplished. The device provides no visual indication that system pressure has moved the device into the interlock position, so that the deactivation procedure is attempted regardless of the system pressure in the vessel. The device as described above can thus be intentionaly or unintentionally manually overriden, thus obviating its interlock capability and subjecting cap removal operators to high risk.

The disadvantages of the prior art are overcome by the present invention, and an improved pressure responsive safety interlock is hereinafter disclosed for preventing the opening of a closure. The device has particular utility for industrial pressure vessels containing hazardous gases, and provides additional safety for operators so that the vessel cap will not be inadvertently removed when the vessel contains a pressurized gas.

SUMMARY OF THE INVENTION

The pressure-responsive safety interlock prevents opening of a pressure vessel cap or closure. The device is ideally suited for use with an industrial vessel adapted for containing a hazardous fluid, and restricts opening of the closure if there is residual pressure in the vessel. The interlock body may be threaded to the vessel, thereby exposing an entrance port to vessel pressure. A chain may connect the interlock stem to the threaded vessel cap, so that the stem must be removed from the body to allow unthreading of the vessel cap.

Pressure in the vessel causes a piston in the interlock body to move to a lock position, so that the stem cannot be unthreaded from the body. The end of the piston may protrude from the interlock body to provide a visual indication that the piston is in the lock position indicative of at least residual pressure in the vessel. Once residual pressure is bleed from the vessel, the piston may be either manually or automatically returned to its unlock position, so that the stem may thereafter be removed from the body.

In an alternate embodiment, the primary locking piston may be secured in the lock position by a secondary piston and a plurality of balls positioned in a keyway. This embodiment has the advantage of a manual override capability only when there is no vessel pressure, and also has the advantage of a visual indication that the piston is in the lock position.

The interlock device of the present invention increases the safety procedure involved in removing a cap or closure from a pressure vessel. A visual indication of vessel pressure may be provided, so that the cap removal operation will not be attempted if residual pressure exists. Either manual or automatic positioning of the piston to the unlock position may be provided, although in the former embodiment, the manual interaction is a separate operation from the stem removal, thus substantially decreasing the likelihood of an operator inadvertently removing the stem when residual pressure exists. Moreover, in an embodiment having the capability of manually positioning the primary locking piston, a secondary pressure-responsive piston may be provided to secure the primary position in its lock position when at least residual pressure exists.

DETAILED DESCRIPTION

Figure 1:
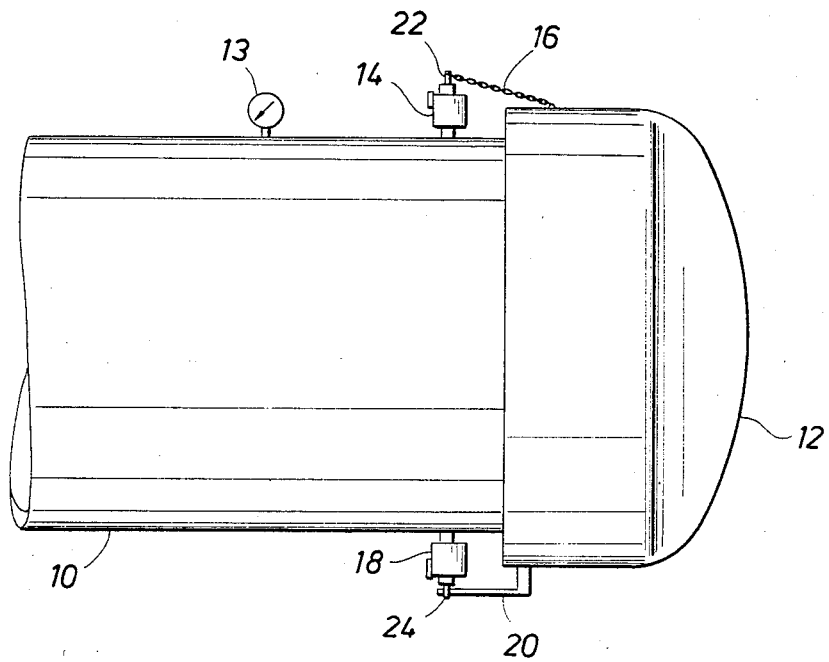
FIG. 1 is a simplified pictorial view of a portion of a pressure vessel including an end cap, and further depicting two illustrative safety interlock devices according to the present invention.

FIG. 1 depicts an industrial pressure vessel 10 having a generally cylindrical configuration for retaining a pressurized fluid. A large end cap 12 is threaded for sealed engagement with the end of vessel 10, and typically may have a diameter of 6 feet or greater and weigh in excess of several tons. A large cap retainer and threading device (not depicted) may be utilized for unthreading the cap 12 from the vessel 10 in order to obtain access to the interior of the vessel for inspection, repair, or service operations. The vessel 10 is suitable for housing a hazardous gas, and accordingly cap 12 should not be removed unless the hazardous gas is first removed from the vessel. In addition to the risk of operator exposure to hazardous gas, the existence of pressure within the vessel during a cap removal operation may subject adjacent operators and equipment to injury or serious damage if system pressure in the vessel suddenly and forcefully breaks the cap free from the vessel. A standard pressure gauge 13 may therefore be provided on the vessel, and operators are instructed not to remove the cap 12 unless gauge 13 indicates that there is no pressure in the vessel 10.

The safety interlock 14 of the present invention provides additional assurance that the cap 12 will not be inadvertently removed when at least nominal pressure, i.e., in excess of 1 psi, is within the vessel. As explained below, the device 14 is typically threaded to the vessel, and stem 22 is removable from device 14. A suitable linking member or stop means, such as chain 16, physically interconnects the cap 12 and the stem 22, so that the chain 16 prohibits unthreading of the cap unless the stem 22 is first removed from the device 14. The stem 22 cannot be removed from the device, however, if there exists pressure within the vessel. Accordingly, interlock 14 provides an additional measure of protection to ensure that the cap operators will not mistakenly attempt to remove cap 12 if there is at least nominal pressure within the vessel. It should be understood that the linking member 16 provides a positive barrier to cap removal unless the stem 22 is removed from the device in the sense that the operator is forced to recognize that the cap should not be unthreaded unless the stem 22 is first removed. From a structural standpoint, the chain 16 need not be designed to withstand the maximum torque that may be exerted on the cap, since the existence of a chain connected to the stem within the device 14 would provide the clearly recognizable notice that cap removal should not be attempted.

FIG. 1 also depicts another embodiment of the invention including device 18 having a stem 24 protruding therefrom. For the present, it may be assumed that the device 18 may be of the general type described above. However, the chain 16 has been replaced with arm 20 rigidly secured to the cap 12. The arm 20 is situated so as to engage the stem 24, which acts as a stop. If the stem 24 is removed from the device 18, the arm 20 may pass by the device 18 and the cap may be unthreaded from the vessel. In practice, only one interlock device according to the present invention will typically be provided for each enclosure 12, although two such devices are depicted in FIG. 1 to illustrate alternate embodiments of the invention which accomplish the same desired result.

Figure 2:
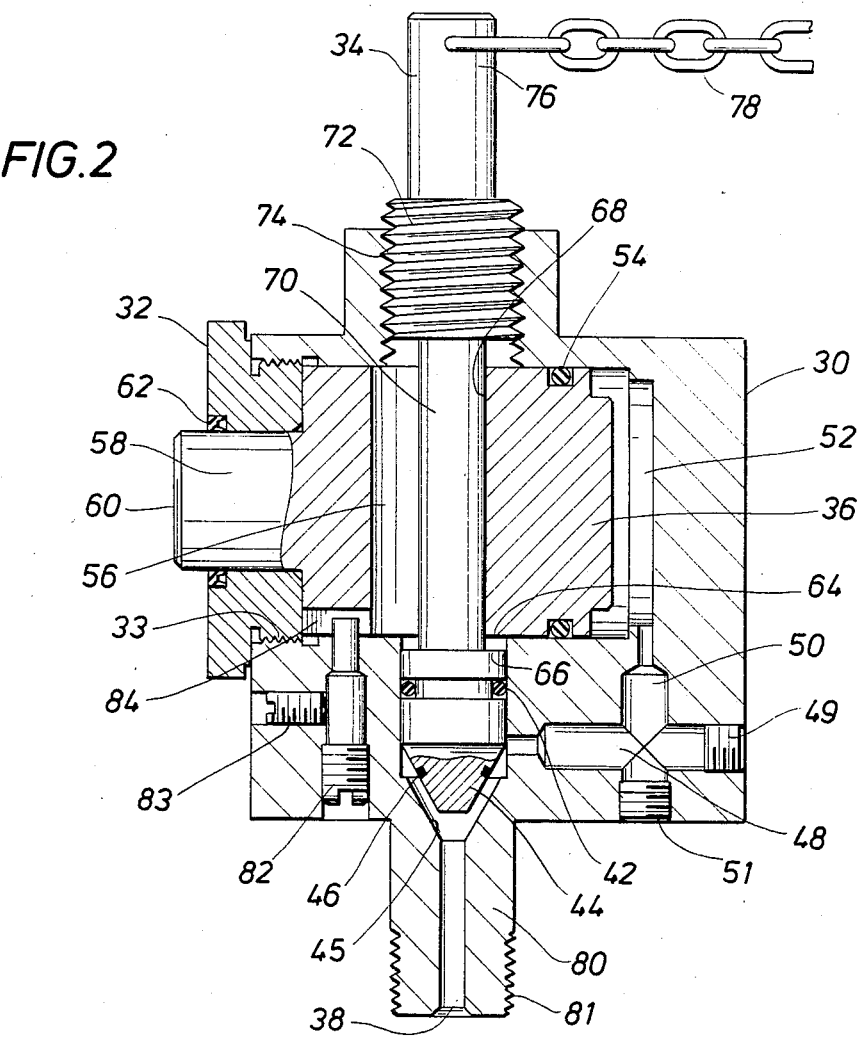
FIG. 2 is a side view, partially in cross-section, of a suitable safety interlock according to the present invention.

FIG. 2 depicts a cross-sectional view of the interlock device 14 shown in FIG. 1. Primary components of the device include body 30, cap 32, stem 34, and piston 36. Entrance port 38 is provided for establishing fluid communication with pressure in vessel 10, and passageways 48 and 50 in body 30 enable fluid communication between the vessel and the piston chamber 52 in the body. The lower portion 40 of stem 34 includes an O-ring sealing member 42 for prohibiting loss of fluid pressure from the device. A cone-shaped end member or valve 44 is carried by the stem and is adapted for sealing engagement with the seating surface 45 in the body. If desired, a plastic sealing member or O-ring 46 may be provided to further ensure that the valve member 44 is in sealing engagement with seat 45, and thereby seal the piston chamber 52 from the vessel fluid.

Piston 36 is preferably provided with a stem passageway 56 having a cross-section slightly larger than the portion 40. O-ring seal 54 provides sealing engagement between the piston and the body, so that pressure in cavity 52 forces piston 36 to the lock position as shown in FIG. 2. In this position, the passageway surface 68 of the piston is in engagement with the portion 70 of the stem, and shoulder surface 66 of portion 40 is in position for engagement with surface 64 of the piston to prevent removal of the stem from the body 30.

The end cap 32 is connected to the body 30 by threads 33, and includes an aperture for receiving indicator portion 58 of the piston. The portion 58 protrudes from the end cap when the piston is in the lock position, and provides a visual indication to the operator that at least nominal pressure is in the vessel. The protruding portion of the member 58 may be painted to highlight this visual indication to the operator. Seals 54 and 52 seal the stem passageway 56 from vessel pressure, and seal 62 need only be a dust prevention seal.

The lower fluid entrance portion 80 of body 30 is provided with threads 81, and the device may thus be sealingly coupled to the vessel 10. During its normal interlock mode, portion 72 of the stem will be threaded to the body at 74, so that the conical member 44 seals the passageway 48 from the interior of the vessel. Body threads 74 thus define a stem port opposite port 30 with respect to the piston chamber, so that the stem 34 can only be axially removed from the body by an unthreading operation. The interior of the safety device need not be continually subjected to either fluid from within the vessel or fluid pressure from the vessel, thereby prolonging the life of the device and reducing the likelihood of plugging. Unless and until cap removal 12 is desired, various fluids may occupy vessel 10 without having any affect on the components downstream from seal 46, since those components may be sealed from fluid in the vessel.

Even an inexperienced operator would readily recognize that the cap 12 should not be removed if chain 16 is interconnecting the cap and the stem 22 is not removed from the body 30. If there is pressure in the vessel, piston 36 would be forced to the lock position as the operator begins to unthread the stem 34 from the body 30 and the seal with seat 45 is broken. The stem may thereafter be unthreaded until shoulder surface 66 engages the piston, whereby further unthreading of the stem is not possible. Once the piston moves to the lock position, indicator portion 58 will protrude from the end cap 32, thereby providing a visual indication of at least nominal pressure in the vessel.

As previously indicated, gauge 13 may inaccurately read zero pressure, and the operator may have reason to question whether there is in fact any pressure in the vessel. The operator may thus thread the stem to the position as shown in FIG. 2, and may thereafter press on the surface 60 of the piston in an attempt to manually override the piston and move it in the unlock or centered position. If no system pressure exists, the piston will move manually to the center position and will remain in that state so that the stem 34 may thereafter be removed from the body 30. If high system pressure exists, the operator will be unable to force the piston to the centered position and the stem could therefore not be removed. If a low or nominal pressure exists in the vessel, the operator may be able to force the piston to the centered position, but the operator should perceive a noticable resistance to this centering operation. Moreover, the piston will return to its lock position once the override force is released from the surface 60. Since the manual override or piston centering operation is distinct from the stem removal operation, the operator cannot with a single motion both manually override the device and deactivate the interlocking member of the device, i.e., remove the stem. Those skilled in the art will recognize that the above advantages will also be obtained if the operator threads the stem into sealed engagement with seat 45 before attempting the manual override operation. In this case, the fluid in the piston chamber must be compressed to center the position, and the subsequent stem unthreading operation will again move the piston into the lock position before the shoulder surface passes by the lower surface 64 of the piston.

A piston alignment pin 82 is provided for engaging the side walls of slot 84 in the piston, thereby preventing the piston from rotating within the piston chamber. Set screw 83 selectively locks the pin 82 in its desired position. Plugs 49 and 51 seal passageways 48 and 50, respectively, and may be removed to service the unit when the stem 34 is in sealed engagement with the seat 45. An axial piston position stop 55 limits travel of the piston in the unlock or centering direction, so that the passageway 56 will be aligned with the slightly smaller diameter portion 40 during the stem removal operation. A strap or chain 78 is secured to the top portion 76 of the stem, and serves as the cap interconnection member.

Figure 3:
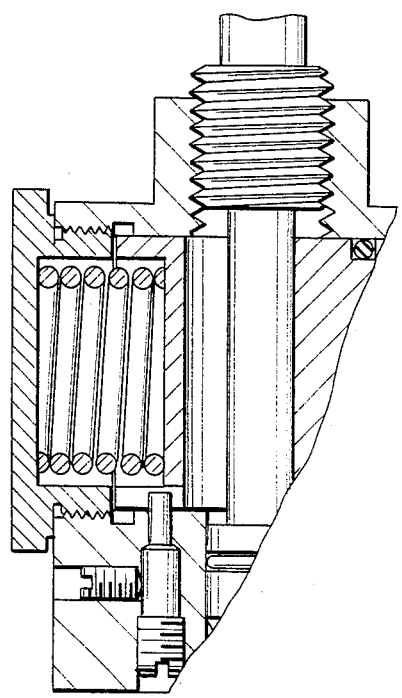
FIG. 3 is a side view, partially in cross-section, of an alternate embodiment of a portion of the interlock depicted in FIG. 2.

FIG. 3 depicts a portion of an alternate embodiment of the present invention, including a body and stem as previously described. A solid-face end cap 90 is threaded to the body at 92, so that the body and end cap enclose the modified piston 94 and prevent manual manipulation of the piston. The piston 94 is shown in FIG. 3 in the lock position, and a cavity 96 between the inner face of the cap 90 and the piston houses a biasing means or spring 98. The other components of the device, including those not depicted in FIG. 3, may be of the type previously described.

The spring 98 biases the piston 94 toward the unlock position. This biasing force is overcome when there is fluid pressure acting on the piston, so that the piston is moved to the lock position by fluid pressure in excess of any nominal amount. The advantage of the embodiment shown in FIG. 3 is that operator access for centering the piston is denied, and accordingly, the device cannot be manually overridden even under low system pressure. A disadvantage of this embodiment, however, is that a visual indication of the piston position is not provided. Piston access to otherwise ensure free or unencumbered manual piston manipulation is denied, and the piston could unknowingly become frozen in the unlock position. Moreover, should the unit become plugged and the piston freeze in the lock position, the spring force may not be sufficient to automatically return the piston to the unlock position although hazardous gas has been fully removed from the vessel.

The biasing force of spring 98 may be selected to be only slightly greater than the force required to bias the piston to the unlock position when there is no pressure in the vessel. Generally, the biasing force of spring 98 is in the range of from 1.5 lbs. to 10 lbs., and preferably from 2 lbs. to 7 lbs., so that only a nominal fluid pressure of 1 psi or less will be necessary to automatically move the piston to the lock position.

Figure 4:
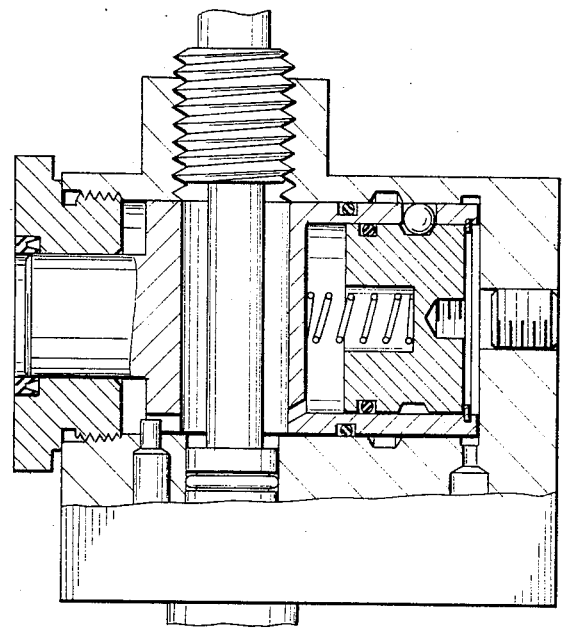
FIG. 4 is a simplified side view, partially in cross-section, of an alternate embodiment of the present invention.

FIG. 4 depicts another embodiment of the present invention, including a body 102, end cap 104, stem 106, and a primary or locking piston 108. The piston 108 as shown in FIG. 4 is in the centered or unlock position, so that the lower portion 110 of the stem including O-ring 112 may be unthreaded from the body. Indicator portion 114 of the piston resides within an aperture provided in the end cap 104, with seal 116 protecting the interior of the body 102 from exposure to dust and moisture. In the unlock position, the end of indicator portion 114 may be flush with the outer surface of the end cap, or may be slightly recessed within the end cap, so that the operator may easily recognize that the piston is centered for removal of the stem.

FIG. 4 depicts a secondary piston 118 movable within the primary piston 108. In the unlock position, spring 121 biases the secondary piston 118 to a position away from the stem 106 and into engagement with snap ring 120 affixed to primary piston 108. Tapered annular grooves 122 and 124 may be provided along the inner surface of the body 102 and the outer surface of the secondary piston 118, and a plurality of holes 126 may be radially drilled through the wall of the piston 108 for receiving an equal number of ball members 128. By way of example, three holes 126 may be equally spaced along the circumference of the piston 108 for receiving three balls 128. Each ball member 128 has a diameter greater than the thickness of the primary piston wall, so that a portion of the ball member must be either in the groove 124 (when in the unlocked position) or in groove 122 (when in the locked position). Sealed engagement of the inner or secondary piston 118 with respect to the primary piston 108 is provided by O-ring 130.

When there is no pressure in cavity 134, spring 121 acting between the primary piston and the inner piston biases the inner piston in the position shown in FIG. 3 with ball members 128 residing partially in groove 124, and the primary piston 108 may be centered. When fluid pressure is transmitted to cavity 134, the primary piston 108 moves toward the stem 106, since the position of the secondary piston 118 is fixed relative to the primary piston by ball members 128 in groove 124. Once the ball members 128 are radially aligned with groove 122 and the primary piston is in the lock position, fluid pressure acting upon the secondary piston 118 will force the ball members out of the groove 124 and partially into groove 122 and, during this motion, compress spring 121. The cross-section of the secondary piston 118 is substantially greater than the primary piston 108, although fluid pressure acting on the secondary piston will be effectively transmitted to the primary piston to keep the primary piston in the lock state during this action. Movement of the secondary piston 118 toward the stem may continue until the arrangement in FIG. 5 is achieved, with the primary piston in the lock position, spring 121 compressed, and the entirety of the ball members 128 projecting outwardly from the outer diameter surface of the inner piston 118.

Figure 5:
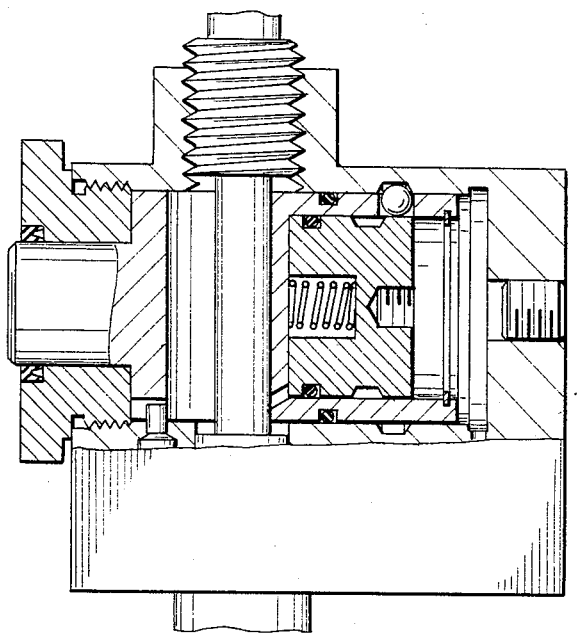
FIG. 5 is a side view, partially in cross-section, of a portion of the apparatus depicted in FIG. 4 in the lock position.

It may be seen in FIG. 5 that the indicator portion 114 projects from the end cap 104 when the piston 108 is in the lock position. If desired, the secondary piston 118 may abut the inner bottom surface of the cup-shaped primary piston 108, with the inner piston having a cylindrical aperture 136 for receiving spring 121. Port 138 may be provided so that fluid pressure in cavity 134 need not compress the gas between the primary and secondary pistons when moving toward the lock position. Plug 132 may be provided to obtain service access to the secondary piston, which may also contain a threaded bore 140 aligned with the plug 132. If necessary, the secondary piston could be manually engaged and returned to the position as shown in FIG. 4. This latter service operation may be required if the secondary piston inadvertently becomes frozen to the primary piston, and this service operation may be performed either with no pressure in the vessel or with the stem in sealing engagement with the seat provided in the fluid passageway to the piston cavity.

When there is no fluid pressure in the cavity 134, spring 121 may position the secondary piston so that the ball members 128 are aligned with slot 124, and the secondary piston is in engagement with the snap ring 120. The primary piston 108 may then be manually centered by pressing on the indicator portion 114, forcing the ball members out of the slot 122 and into the slot 124. The primary piston will then again be in a position as shown in FIG. 4.

An advantage of the embodiment as shown in FIGS. 4 and 5 is that a visual indication of the position of the primary piston is provided, and the primary piston may be manually centered by the operator if there is no pressure in the piston cavity. If pressure is in the piston cavity, however, the primary piston would be held in the lock position, and this position may not be manually overridden. Nominal pressure in the piston cavity will cause the secondary piston to be in the position as shown in FIG. 5, and it may be seen that the primary piston is locked in that position by ball members 128 and groove 120, and that pressing on projection 124 will not allow the operator to center the piston 108.

The cross-sectional area of piston 36 may be selected so that the piston will be moved to the lock position if pressure in excess of a nominal value, i.e., 1 psi, is in cavity 134. The apparatus of the present invention may thus perform its desired interlock function if pressure in excess of a selected nominal pressure exists in the vessel. Generally, this nominal pressure value will be less than 2 psi, and may be as low as 0.5 psi or even lower. Applicant has found that satisfactory performance may be obtained with a piston 36 having a cross-sectional area of approximately 2.7 square inches. Similarly, the combined cross-sectional area of pistons 108 and 118 may be in the range of from 2.5 to 3.0 square inches. Spring 121 may have the selected range of biasing force as described for spring 98.

A significant advantage of the present invention is that the passageway to the piston cavity may be manually plugged with member 42 to normally prohibit fluid pressure from the inner workings of the device, although this seal will necessarily be broken before the stem can be removed from the body. Although the life of the interior components of the interlock device is substantially increased in this manner, both the metallic components of the device as well as the sealing members may be fabricated from materials resistant to corrosion or substantial deterioration by hazardous fluids.

A key and keyway arrangement between the stem and the body could be provided for axially removing the stem, although the threaded operation disclosed herein is preferable since it requires a sufficient amount of time to ensure that the piston will be moved to the lock position to prohibit stem removal if at least nominal pressure is in the vessel. Means other than a flexible interconnection or a rigid bar may be provided for serving as a stop means to limit movement of the vessel end cap relative to the stem when within the interlock device. For instance, the end of the stem may be configured to serve as a key which must be inserted in a cap vessel lock in order to begin the cap removal operation. Also, the cap may be hinged or secured to the vessel by means other than threads, and the stop means between the stem and the cap may accordingly be altered to provide the same positive barrier benefit.

While the present invention has been disclosed in connection with the above illustrative embodiments, numerous modifications may be made without departing from the spirit or scope of the invention. It should therefore be understood that the embodiments described herein and shown in the accompanying Figures are exemplary only, and are not intended to limit the scope of the present invention.

What is claimed is:

1. A safety interlock device responsive to fluid pressure within a vessel for preventing unthreading of a vessel cap when said vessel contains a fluid under pressure, said interlock device comprising:

an interlock body having an entrance port for fluid communication with said fluid in said vessel, a piston chamber, and a stem port opposite said entrance port with respect to said piston chamber;

an elongate stem at least partially positionable within and axially removable from said interlock body;

stop means for limiting movement of said vessel cap relative to said stem to prevent unthreading of said vessel cap unless said stem is removed from said interlock body;

a piston movable independent of said stem within said piston chamber and responsive to said fluid pressure for moving from an unlock position to a lock position, said piston having a stem passageway for receiving a portion of said stem;

said interlock body having a fluid passageway for establishing fluid communication between said entrance port and said piston chamber, and a portion of said fluid passageway defining a seating surface;

a valve member carried by said stem for sealing engagement with said seating surface for controlling fluid flow through said fluid passageway; and said stem including a shoulder for engagement with said piston in said lock position to prevent removal of said stem from said body.

2. An interlock device as defined in claim 1, further comprising:

stem sealing means between said stem and said body for prohibiting loss of fluid pressure from said body.

3. An interlock device as defined in claim 2, further comprising:

said body including a threaded fluid entrance portion for threaded engagement with said vessel; and said stem includes a threaded portion for threaded engagement with said body.

4. An interlock device as defined in claim 2, wherein said seating surface and said stem port are each axially aligned with said elongate stem in said body.

5. An interlock device as defined in claim 1, further comprising:

a piston stop for limiting rotation of said piston relative to said body; and piston sealing means between said piston and said body.

6. An interlock device as defined in claim 1, further comprising:

an external end cap defining a portion of said piston chamber and having an aperture for receiving an indicator portion of said piston; and said indicator portion of said piston projecting from said end cap when said piston is in a lock position as a visual indication of pressure within said vessel.

7. A safety interlock device as defined in claim 3, wherein said stem passageway has a slightly larger cross-section than said shoulder.

8. A safety interlock device as defined in claim 1, wherein said stop means comprises a chain for connecting said stem and said vessel cap.

9. A safety interlock device as defined in claim 1, wherein said step means comprises a stop member rigidly affixed to said vessel cap for engagement with said stem when said stem is positioned within said interlock body.

10. An interlock device as defined in claim 2, further comprising:

a solid end cap defining a portion of said piston chamber; and biasing means between said end cap and said piston for automatically biasing said piston towards said unlock position.

11. A safety interlock device responsive to fluid pressure in a vessel for preventing opening of a vessel cap when said vessel contains a fluid under at least a nominal pressure, comprising:

an interlock body having an entrance port for fluid communication with said fluid in said vessel, a piston chamber, and a stem port;

a stem positionable at least partially within and axially removable from said interlock body;

stop means for limiting movement of said vessel cap relative to said stem to prevent opening of said vessel cap unless said stem is removed from said interlock body;

a piston movable independent of said stem within said piston chamber and responsive to said fluid pressure for moving from an unlock position to a lock position, said piston having a stem passageway for receiving a portion of said stem; and said stem including a shoulder portion for engagement with said piston in said lock position to prevent removal of said stem from said body.

12. A safety interlock device as defined in claim 11, further comprising:

stem sealing means between said stem and said body for prohibiting loss of fluid pressure from said body.

13. A safety interlock device as defined in claim 12, wherein said stem includes a threaded portion for threaded engagement with said body.

14. A safety interlock device as defined in claim 11, further comprising:

an external end cap defining a portion of said piston chamber and having an aperture for receiving an indicator portion of said piston; and said indicator portion of said piston projecting from said end cap when said piston is in a lock position as a visual indication of pressure within said vessel.

15. A safety interlock device as defined in claim 11, further comprising:

said interlock body having a fluid passageway for establishing fluid communication between said entrance port and said piston chamber, and a portion of said fluid passageway defining a seating surface;

a valve member carried by said stem for sealing engagement with said seating surface for controlling fluid flow through said fluid passageway; and said seating surface and said stem port are each axially aligned with said elongate stem in said body.

16. A safety interlock device as defined in claim 10, further comprising:

said piston having an effective cross-sectional area responsive to said fluid pressure of at least 2.5 square inches;

a piston rotation stop for limiting rotation of said piston relative to said body; and a piston axial stop for limiting axial movement of said piston in said unlock position.

17. A safety interlock device responsive to fluid pressure in a vessel for preventing the opening of a vessel cap when said vessel contains fluid under pressure, said interlock device comprising:

an interlock body having an entrance port for fluid communication with fluid pressure in said vessel, a piston chamber, and a stem port;

an elongate stem for positioning at least partially within and axially removable from said interlock body;

stop means for limiting movement of said vessel cap relative to said stem to prevent opening of said cap unless said stem is removed from said interlock body;

a first piston movable independent of said stem and responsive to said fluid pressure for moving from an unlock position to a lock position, said piston having a stem passageway for receiving a portion of said stem;

a second piston movable relative to both said first piston and said interlock body in response to fluid pressure;

a first piston stop operationally responsive to a position of said second piston relative to said interlock body for prohibiting movement of said first piston to said unlock position; and said stem including a shoulder portion for engagement with said piston in said lock position to prevent removal of said stem from said body.

18. An interlock device as defined in claim 17, wherein said first piston stop comprises a plurality of ball members radially movable from a position extending outward of an exterior surface of said first piston to a position extending inward of an inner surface of said first piston.

19. A safety interlock device as defined in claim 17, further comprising:

said interlock body having fluid passageway for establishing communication between said entrance port and said piston chamber, and a portion of said fluid passageway defining a seating surface;

a valve member carried by said stem for sealing engagement with said seating surface for controlling fluid flow through said fluid passageway.

20. A safety interlock device as defined in claim 19, further comprising:

stem sealing means between said valve member and said body for prohibiting loss of fluid pressure from said body.

* * * * *